United States Patent
Kawasaki

Patent Number: 5,875,317
Date of Patent: Feb. 23, 1999

[54] BOOSTING CONTROL METHOD AND PROCESSOR APPARATUS HAVING BOOSTING CONTROL PORTION

[75] Inventor: Hirota Kawasaki, Kawasaki, Japan

[73] Assignee: Fujitsu Limited, Kawasaki, Japan

[21] Appl. No.: 505,965

[22] Filed: Jul. 24, 1995

[30] Foreign Application Priority Data

Jul. 28, 1994 [JP] Japan ............................ 6-176261

[51] Int. Cl.$^6$ ........................................ G06F 9/38
[52] U.S. Cl. ............... 395/395; 395/800.23; 395/569
[58] Field of Search .................... 395/392, 393, 395/395, 383, 800, 591, 800.23, 800.41, 569, 394, 567

[56] References Cited

U.S. PATENT DOCUMENTS

| | | | |
|---|---|---|---|
| 5,396,640 | 3/1995 | Ikenaga et al. | 395/393 |
| 5,450,588 | 9/1995 | Hoxey | 395/383 |
| 5,504,914 | 4/1996 | Lai | 395/800 |
| 5,524,224 | 6/1996 | Denman et al. | 395/393 |
| 5,526,499 | 6/1996 | Bernstein et al. | 395/392 |
| 5,537,559 | 7/1996 | Kane et al. | 395/591 |

OTHER PUBLICATIONS

Richard L. Sites, ed., Alpha Architecture Reference Manual, Digital Press, pp. 4–115 through 4–116, Dec. 1992.

Todd C. Mowry, Tolerating Latency Through Software Controlled Data Prefetching, Stanford University, Sections 1.2.4, 1.2.5 and Chapter 2, pp. 7–11, 18–52, May 1994.

Smith et al., Boosting Beyond Static Scheduling in a Superscalar Processor, May 1990, IEEE, pp. 344–354.

Ando et al., Speculative Execution and Reducing Branch Penalty in a Parallel Issue Machine, Oct. 1993, pp. 106–113, IEEE.

Diep et al., Architecture –Compatible Code Boosting for Performance Enhancement of IBM RS/6006, Oct. 1993, pp. 86–93, IEEE.

Chang et al., Three Architectural Models for Compiler–Controlled Speculative Execution, IEEE, Apr. 1995, pp. 481–494.

*Primary Examiner*—Parshotam S. Lall
*Assistant Examiner*—Patrice L. Winder
*Attorney, Agent, or Firm*—Staas & Halsey

[57] ABSTRACT

A boosting control method and control apparatus boosts an execution timing of an instruction to be executed as the result of the execution of a branch instruction without a need to wait for the execution of the branch instruction. A boosting control instruction that represents the position of a boosted instruction is placed in an instruction sequence including the boosted instruction. When the instruction sequence including the boosting control instruction is executed, the execution state of a boosted instruction that is represented by the boosting control instruction placed before the branch instruction corresponding to the execution result in the instruction sequence and that is executed before the branch instruction is controlled.

40 Claims, 13 Drawing Sheets

| STAGE LABEL AND INSTRUCTION OPERAND | | | COMMENT |
|---|---|---|---|
| FRAMW | add | r2, r3, r4 | r2 = r3 +r4 |
| FRAMW | nop | | NO OPERATION |
| FRAMW | nop | | NO OPERATION |
| FRAMW | nop | | NO OPERATION |
| FRAMW | br | r2, 0, L1 | BRANCHES TO L1 1F r2 ==0 |
| L1:add | | r2, r5, r6 | r2 = r5 +r6 |

FIG. 3

| STAGE LABEL AND INSTRUCTION OPERAND | | | COMMENT |
|---|---|---|---|
| FRAMW | add | r2, r3, r4 | r2 = r3 +r4 |
| FRAMW | add.b | r2, r5, r6 | BOOSTED INSTRUCTION OF r2 = r5 +r6 |
| FRAMW | nop | | NO OPERATION |
| FRAMW | nop | | NO OPERATION |
| FRAMW | br | r2, 0, L1 | BRANCHES TO L1 1F r2 ==0 |
| L,1 | | | |

FIG. 4

| LABEL AND INSTRUCTION OPERAND | | | COMMENT |
|---|---|---|---|
| add | r2, r3, r4 | | r2 = r3 +r4 |
| br | r2, 0, L1 | | BRANCHES TO L1 1F r2 == 0 |
| add | r3, r5, r6 | | r3 = R5 +r6 |
| . | | | |
| . | | | |
| L1: . | | | |

FIG. 5

| LABEL AND INSTRUCTION OPERAND | | COMMENT |
|---|---|---|
| add | r2, r3, r4 | r2 = r3 +r4 |
| add.bn | r3, r5, r6 | r3 = r5 +r6 UNLESS r2 == 0 |
| br | r2, 0, L1 | BRANCHES TO L1 IF r2 == 0 |
| . | | |
| . | | |
| L1: . | | |

FIG. 6

| LABEL AND INSTRUCTION OPERAND | | COMMENT |
|---|---|---|
| add | r2, r3, r4 | r2 = r3 +r4 |
| br | r2, 0, L1 | BRANCHES TO L1 IF r2 == 0 |
| add | r3 r5, r6 | r3 = r5 +r6 |
| | | |
| L1 :add | r4, r7, r8 | r4 = r7 +r8 |

FIG. 7

| LABEL AND INSTRUCTION OPERAND | | COMMENT |
|---|---|---|
| add | r2, r3, r4 | r2 = r3 +r4 |
| add. bn | r3, r5 r6 | r3 = r5 +r6 IF r2 == 0' |
| add. b | r4, r7, r8 | r4 = r7 +r8 IF r2 == 0 |
| br | r2, 0, L1 | BRANCHES TO L1 IF r2 == 0 |
| • | | |
| • | | |
| L1: • | | |

FIG. 8

| LABEL AND INSTRUCTION OPERAND | | COMMENT |
|---|---|---|
| add | r2, r3, r4 | r2= r3 +r4 |
| br | r2, 0, L1 | BRANCHES TO L1 IF r2 == 0 |
| . | | |
| . | | |
| L1: add | r3, r5, r6 | r3= r5 +r6 |
| br | r3, 0, L2 | BRANCHES TO L2 IF r3 == 0 |
| . | | |
| . | | |
| L2: add | r4, r7, r8 | r4= r7 +r8 |

FIG. 9

| LABEL AND INSTRUCTION OPERAND | | COMMENT |
|---|---|---|
| add | r2, r3, r4 | r2 = r3 +r4 |
| add.b | r2, r3, r6 | BOOSTED BEFORE ONE BRANCH INSTRUCTION |
| add.b2 | r4, r7, r8 | BOOSTED BEFORE TWO BRANCH INSTRUCTIONS |
| br | r2, 0, L1 | BRANCHES TO L1 IF r2 == 0 |
| . | | |
| . | | |
| L1: br | r3, 0, L2 | BRANCHES TO L2 IF r3 == 0 |
| . | | |
| . | | |
| L2 | . | |

FIG. 10

| LABEL AND INSTRUCTION OPERAND | | COMMENT |
|---|---|---|
| add  r2, r3, r4 | | r2 = r3 +r4 |
| boost | | HERE IN AFTER, INSTRUCTION BOOSTED FROM THE TAKEN SIDE |
| add  r2, r5, r6 | | r2 = r5 +r6 |
| br   r2, 0, L1 | | BRANCHES TO L1 IF r2 == 0 |
| . | | |
| . | | |
| L1: . | | |

| LABEL AND INSTRUCTION OPERAND | | | COMMENT |
|---|---|---|---|
| add | r2, r3, r4 | | r2 = r3 +r4 |
| boost. n | | | HERE IN AFTER, INSTRUCTION BOOSTED FROM THE NOT TAKEN SIDE |
| add | r3, r5, r6 | | r3 = r5 +r6 UNLESS r2 == 0 |
| br | r2, 0, L1 | | BRANCHES TO L1 IF r2 == 0 |
| | . | | |
| | . | | |
| L1: | . | | |

FIG. 13

| LABEL AND INSTRUCTION OPERAND | | | COMMENT |
|---|---|---|---|
| add | r2, r3, r4 | | r2 = r3 +r4 |
| boost. n | | | HERE IN AFTER INSTRUCTION BOOSTED FROM THE NOT TAKEN SIDE |
| add | r3, r5 r6 | | r3 = r5 +r6 UNLESS r2 == 0 |
| boost | | | HERE IN AFTER, INSTRUCTION BOOSTED FROM TAKEN SIDE |
| add | r4, r7, r8 | | r4 = r7 +r8 IF r2 == 0 |
| br | r2, 0, L1 | | BRANCHES TO L1 IF r2 == 0 |
| | . | | |
| | . | | |
| L1: | . | | |

FIG. 14

| LABEL AND INSTRUCTION OPERAND | | COMMENT |
|---|---|---|
| add | r2, r3, r4 | r2 = r3 +r4 |
| boost | | HERE IN AFTER, INSTRUCTION BOOSTED FROM THE TAKEN SIDE |
| add | r3, r5, r6 | BOOSTED BEFORE ONE BRANCH INSTRUCTION |
| boost | | HERE IN AFTER, INSTRUCTION BOOSTED FROM THE TAKEN SIDE |
| add | r4, r7, r8 | BOOSTED BEFORE TWO BRANCH INSTRUCTIONS |
| br | r2, 0, L,1 | BRANCHES TO L1 IF r2 == 0 |
| . | | |
| . | | |
| L1 : br | r3, 0, L2 | BRANCHES TO L2 IF r3 == 0 |
| . | | |
| L2: | . | |

FIG. 15

| LABEL AND INSTRUCTION OPERAND | | COMMENT |
|---|---|---|
| add | r2, r3, r4 | r2 = r3 +r4 |
| add | r3, r5, r6 | r3 = r5 +r6 |
| br | r2, 0, L1 | BRANCHES TO L1 IF r2 == 0 |
| . | | |
| . | | |
| L1:br | r3, 0, L2 | BRANCHES TO L2 IF r3 == 0 |
| . | | |
| . | | |
| L2:add | r4, r7, r8 | r4 = r7 +r8 |

FIG. 16

| LABEL AND INSTRUCTION OPERAND | | COMMENT |
|---|---|---|
| add | r2, r3, r4 | r2 = r3 +r4 |
| add | r3, r5, r6 | r3 = r5 +r6 |
| boost2 | | |
| add | r4, r7, r8 | BOOSTED BEFORE TWO BRANCH INSTRUCTIONS |
| br | r2, 0, L1 | BRANCHES TO L1 IF r2 == 0 |
| . | | |
| . | | |
| L1:br | r3, 0, L2 | BRANCHES TO L2 IF r3 == 0 |
| . | | |
| L2: | | |

FIG. 17

| LABEL AND INSTRUCTION OPERAND | | COMMENT |
|---|---|---|
| add | r2, r3, r4 | r2 = r3 +r4 |
| br | r2, 0, L1 | BRANCHES TO L1 IF r2 == 0 |
| . | | |
| . | | |
| L1: add | r3, r5, r6 | r3 = r5 +r6 |
| br | r3, 0, L2 | BRANCHES TO L2 IF r3 == 0 |
| add | r4, r7, r8 | r4 = r7 +r8 |
| . | | |
| . | | |
| L2: | . | |

FIG. 18

| LABEL AND INSTRUCTION OPERAND | COMMENT |
|---|---|
| add r2, r3, r4 boost | r2 = r3 +r4 |
| add r3, r5, r6 boost. n | r3 = r5 +r6 |
| add r4, r7, r8 | BOOSTED BEFORE TWO BRANCH INSTRUCTIONS |
| br r2, 0, L1 | BRANCHES TO L1 IF r2 == 0 |
| . . . | |
| L1:br r3, 0, L2 | BRANCHES TO L2 IF r3 == 0 |
| . . . | |
| L2: . | |

FIG. 19

| LABEL AND INSTRUCTION OPERAND | COMMENT |
|---|---|
| add r2, r3, r4 boost. n | r2 = r3 +r4 |
| add r3, r5, r6 reverse | r3 = r5 +r6 UNLESS r2 == 0 |
| add r4, r7, r8 | r4 = r7 +r8 IF r2 == 0 |
| br r2, 0, L1 | BRANCHES TO L1 IF r2 == 0 |
| . . . | |
| L1: . | |

FIG. 20

BOOSTING CONTROL METHOD AND PROCESSOR APPARATUS HAVING BOOSTING CONTROL PORTION

BACKGROUND OF THE INVENTION

1. Field of the Invention

The present invention relates to boosting control technology for use with a pipeline processor apparatus.

2. Description of the Related Art

To allow a computer system to execute instructions at high speed, it should be controlled so that the idle state of an instruction pipeline of a processor is as short as possible, and that the instruction pipeline is not stalled. In particular, a VLIW (Very Long Instruction Word) system and a super scalar processor are provided with hardware that executes a plurality of operations at a time. To effectively use this hardware, operations to be executed should be supplied to the processor. To satisfy such a requirement, a compiler that generates execution code for the processor analyzes the dependency of data for a corresponding software and changes the sequence of the operations according to the analyzed result, without changing the purpose of the software, so as to optimize the execution code.

To further improve the operating efficiency of the hardware, a technology called boosting has been employed. This technology will be described, next.

FIG. 1 is a schematic diagram for explaining a fundamental pipeline process that a pipeline processor executes.

In FIG. 1, instructions A to D are executed at each instruction cycle by an instruction fetch unit, a register read unit, an arithmetic and logic unit (ALU), a memory access unit, and a register write unit (these are not shown).

At the instruction cycle 1, an instruction fetch stage (referred to as the F stage) for the instruction A is executed by the instruction fetch unit.

At the instruction cycle 2, a register read stage (referred to as the R stage) for the instruction A is executed by the register read unit. In addition, the F stage for the instruction B, which follows the instruction A, is executed by the instruction fetch unit.

At the instruction cycle 3, an arithmetic and logic operation stage (referred to as the A stage) for the instruction A is executed by the arithmetic and logic unit. The R stage for the instruction B is executed by the register read unit. In addition, the F stage for the instruction C, which follows the instruction B, is executed by the instruction fetch unit.

At the instruction cycle 4, a memory access stage (referred to as the M stage) for the instruction A is executed by the memory access unit. The A stage for the instruction B is executed by the register read unit. The R stage for the instruction C is executed by the register read unit. In addition, the F stage for the instruction D, which follows the instruction C, is executed by the instruction fetch unit.

At the instruction cycle 5, a register write stage (referred to as the W stage) for the instruction A is executed by the register write unit. The M stage for the instruction B is executed by the memory access unit. The A stage for the instruction C is executed by the arithmetic and logic unit. The R stage for the instruction D is executed by the register read unit. In addition, the F stage for an instruction E (not shown), which follows the instruction D, is executed by the instruction fetch unit.

In the pipeline process composed of five stages of the F stage, the R stage, the A stage, the M stage, and the W stage, it is assumed that the operation result for each instruction can be used after the W stage for the instruction is finished. In addition, it is assumed that a branch condition designated by a branch instruction is determined in the R stage.

Next, as example 1, the execution of an instruction sequence shown in FIG. 2 will be described.

In this example, to determine a branch instruction "br r2,0,L1", the operation result of an operation instruction "add r2,r3,r4" that operates on the value of a register r2, is required. Thus, as shown in FIG. 3, the R stage for the branch instruction cannot be executed until the W stage for the operation instruction is finished. Thus, an idle stage takes place in the pipeline process (in this state, an instruction is not executed). In FIG. 3, when the instruction sequence is executed, a non-operation instruction (referred to as a nop instruction) is inserted in the instruction sequence by an interlock portion of the hardware. Alternatively, when the compiler executes the instruction sequence, it places the non-arithmetic instruction in the instruction sequence.

In the state shown in FIG. 3, since the nop instruction is inserted, the execution speed of the entire pipeline process decreases. A technique that prevents the execution speed from decreasing is known. In this technique, the compiler moves an instruction to be branched to the position that just precedes a branch instruction, so as to execute the instruction to be branched without a need to wait until the execution of the branch instruction. In addition, when a branch condition determined as the result of the execution of the branch instruction is satisfied (taken), the execution result of the instruction to be branched that has been executed is validated. When the branch condition is not satisfied (not taken), the execution result of the instruction to be executed that has been executed is cancelled. This technique is called the boosting. An instruction that is temporarily executed in the condition that the execution thereof is not sure and that the validity/invalidity of the temporary execution thereof is determined corresponding to the determined branch condition, is referred to as a boosted instruction. The boosted instruction is detected corresponding to the analyzed result of the program and the collected result of statistic information by the compiler. The detected result affects execution code.

FIG. 4 is a list showing an instruction sequence including an instruction boosted from the taken side corresponding to the example 1 of the instruction sequence shown in FIG. 3. When an operation instruction "add r2,r5,r6" is boosted, it is executed as "add.b r2,r5,r6" before a branch instruction "br r2,0,L1". Thus, the number of nop instructions included in the instruction sequence to be executed can be decreased.

When the A stage of the operation instruction "add.b r2,r5,r6" is executed before the branch instruction "br r2,0, L1", the value to be written to the register r2 as the result of the execution is temporarily stored in the arithmetic and logic unit, but not written to the register r2. This value is written to the register r2 when the W stage of the operation instruction is executed. Thus, before the W stage of the operation instruction is executed, when the R stage of the branch instruction "br r2,0,L1" is executed, the content of the register r2 is not rewritten corresponding to the operation instruction to be executed after the branch instruction.

When the number of stages is large as in a super pipeline system, or when a plurality of operations are executed at a time as in a VLIW system or a super scalar processor, after the operated result becomes valid when a branch condition is determined, many instructions may be executable. Thus, the boosting technique works more effectively.

An instruction to be boosted is detected corresponding to the analyzed result of the program and the collected result of the statistical information by the compiler. As a result, the boosted instruction may be an instruction to be branched that just follows a branch instruction and that is executed when a branch condition of the branch instruction is not satisfied (namely, on the not-taken side) rather than when the branch condition of the branch instruction is satisfied (namely, on the taken side). For example, when the instruction sequence of the example 2 shown in FIG. 5 is executed, since an operation instruction "add r3,r5,r6" on the not-taken side is boosted, it is executed as an operation instruction "add.bn r3,r5,r6" before the branch instruction "br r2,0,L1" as shown in FIG. 6.

In addition, depending on the analyzed result by the compiler, an instruction on the taken side and another instruction on the not-taken side may be boosted at the same time. For example, when an instruction sequence shown in FIG. 7 is executed as example 3, since an operation instruction "add r3,r5,r6" on the not-taken side and an operation instruction "add r4,r7,r8" on the taken side are boosted, they are executed as operation instructions "add.bn r3,r5,r6" and "add.b r4,r7,r8" before the branch instruction "br r2,0,L1" as shown in FIG. 8.

In addition, corresponding to the analyzed result of the compiler, an instruction may be boosted after a plurality of branch instructions. For example, when an instruction sequence shown in FIG. 9 is executed as example 4, since an operation instruction "add r3,r5,r6" on the taken side corresponding to a first branch instruction "br r2,0,L1" is boosted, the operation instruction "add r3,r5,r6" is executed as an operation instruction "add.b r3,r5,r6" before the first branch instruction as shown in FIG. 10. In addition, when an operation instruction "add r4,r7,r8" on the taken side corresponding to a second branch instruction "br r3,0,L2" is boosted, the operation instruction "add r4,r7,r8" is executed as an operation instruction "add.b2 r4,r7,r8" before the second and first branch instructions.

However, in the conventional boosting method shown in FIGS. 4, 6, 8, and 10, to clearly represent the boosted instructions in the execution codes, instruction codes that represent boosted instructions other than conventional instruction codes are required.

For example, in the example shown in FIG. 4, the instruction code "add.b" is an instruction code boosted from the taken side corresponding to the conventional instruction code "add". In the example shown in FIG. 6, an instruction code "add.bn" that is boosted on the not-taken side is used. In the example shown in FIG. 8, both an instruction code "add.b" boosted from the taken side and an instruction code "add.bn" boosted from the not-taken side are used. In the example shown in FIG. 10, an instruction code "add.b2" boosted after a plurality of branch instructions is also used.

As described above, in the related art reference, instruction codes that represent boosted instructions other than conventional instruction codes are required. In addition, such instruction codes are required corresponding to types of conventional instruction codes. However, the types of instruction codes that are executable in the processor are limited by an instruction format defined by the processor. Thus, in the above-described conventional boosting method, instruction codes that represent boosted instructions may be not obtained. In particular, it is more difficult to obtain instruction codes that represent boosted instructions that maintain compatibility with conventional instruction codes. In contrast, to use more instruction codes that represent boosted instructions, the types of instruction codes should be reduced.

SUMMARY OF THE INVENTION

An object of the present invention is to provide a pipeline processor apparatus for performing boosting control with minimizing of restrictions, such as the types of conventional instruction codes.

According to the present invention, a boosting control instruction that represents the position of a boosted instruction is placed in an instruction sequence in which the boosted instruction is placed. When the instruction sequence in which the boosting control instruction is placed is executed, the execution state of the boosted instruction that is represented by the boosting control instruction executed before a branch instruction and that is executed before the branch instruction, is controlled corresponding to the execution result of the branch instruction in the instruction sequence.

These and other objects, features and advantages of the present invention will become more apparent in light of the following detailed description of best mode embodiments thereof, as illustrated in the accompanying drawings.

BRIEF DESCRIPTION OF DRAWINGS

FIG. 3 is a list showing a pipeline operation corresponding to the instruction sequence of the example 1;

FIG. 4 is a list showing a pipeline operation of an instruction sequence including an instruction boosted from the taken side corresponding to the instruction sequence of example 1 of a related art reference;

FIG. 5 is a list showing an instruction sequence as example 2;

FIG. 6 is a list showing an instruction sequence including an instruction boosted from the not-taken side corresponding to the instruction sequence of the example 2 of the related art reference;

FIG. 7 is a list showing an instruction sequence as example 3;

FIG. 8 is a list showing an instruction sequence including instructions boosted from both branch sides according to the instruction sequence of the example 3 of the related art reference;

FIG. 9 is a list showing an instruction sequence as example 4;

FIG. 10 is a list showing an instruction sequence including a boosted instruction placed before a plurality of branch instructions according to the instruction sequence of the example 4 of the related art reference;

FIG. 13 is a list showing an instruction sequence including an instruction boosted from the not-taken side corresponding to the instruction sequence of the example 2 according to the embodiment of the present invention;

FIG. 14 is a list showing an instruction sequence including instructions boosted from both branch sides corresponding to the instruction sequence of the example 3 according to the embodiment of the present invention;

FIG. 15 is a list showing an instruction sequence including boosted instructions placed before a plurality of branch instruction corresponding to the instruction sequence of the example 4 according to the embodiment of the present invention;

FIG. 16 is a list showing an instruction sequence as example 5;

FIG. 17 is a list showing an instruction sequence including a boosted instruction simply placed before a plurality of branch instructions corresponding to the instruction sequence of the example 5 according to this embodiment;

FIG. 18 is a list showing an instruction sequence as example 6;

FIG. 19 is a list showing an instruction sequence including boosted instructions complicatedly placed before a plurality of branch instructions corresponding to the instruction sequence of the example 6 according to the embodiment;

FIG. 20 is a list showing an instruction sequence including an instruction boosted from both branch sides (using a reverse instruction) corresponding to the instruction sequence of the example 3 according to the embodiment;

DESCRIPTION OF PREFERRED EMBODIMENTS

Figures 11, 12:
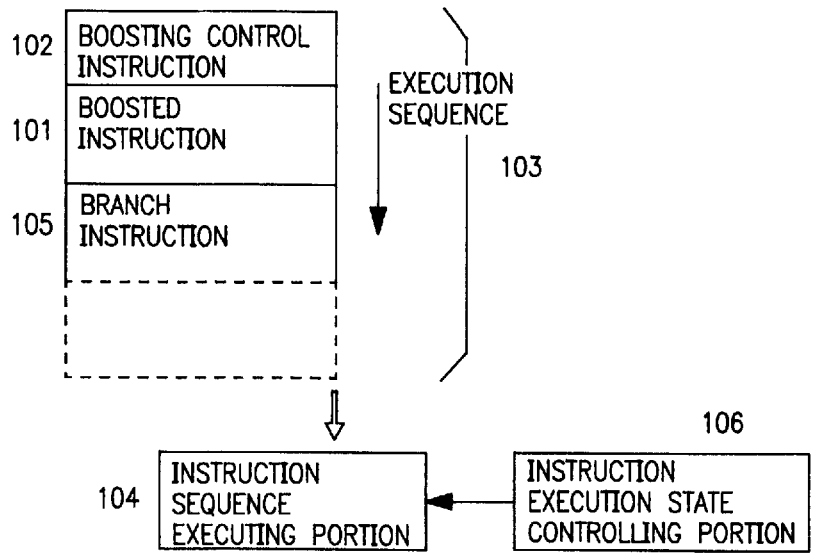
FIG. 11 is a schematic diagram for explaining the theory of the present invention.
FIG. 12 is a list showing an instruction sequence including an instruction boosted from the taken side corresponding to the instruction sequence of the example 1 according to an embodiment of the present invention.

FIG. 11 is a block diagram showing the theory of the present invention.

The present invention is a processor apparatus having a boosting control portion that executes an instruction sequence including a boosted instruction that is executed corresponding to the execution result of a branch instruction without a need to wait until the branch instruction is executed.

An instruction sequence executing portion 104 executes an instruction sequence 103 that includes a boosted instruction 101 and a boosting control instruction 102 that represents the position of the boosted instruction 101. The boosting control instruction 102 includes a first boosting instruction that represents the boosted position of an instruction that is executed when, for example, a branch condition of a branch instruction is satisfied. In addition, the boosting control instruction 102 includes a second boosting instruction that represents the boosted position of an instruction that is executed when a branch condition of a branch instruction is not satisfied. Moreover, the boosting control instruction 102 includes a reverse instruction in addition to the first boosting instruction or the second boosting instruction. The reverse instruction represents the boosted position of an instruction that is executed when the reverse instruction just precedes the first boosting instruction and a branch condition of a branch instruction that is the same as the branch condition of the branch instruction corresponding to the first boosting instruction, is not satisfied. In addition, the reverse instruction represents the boosted position of an instruction that is executed when the reverse instruction just precedes the second boosting instruction and a branch condition of a branch instruction that is the same as the branch condition of the branch instruction corresponding to the second boosting instruction, is satisfied. In this case, it is defined that when there are a plurality of first boosting instructions or second boosting instructions in one fundamental block of the instruction sequence, an n-th first or second boosting instruction in the fundamental block represents the position of a boosted instruction placed before n branch instructions. Furthermore, the boosting control instruction 102 may include a third boosting instruction that represents the position of a boosted instruction placed before, for example, n branch instructions.

When the instruction sequence 103 is executed by the instruction sequence executing portion 104, an instruction execution state controlling portion 106 controls the execution state of the boosted instruction 101 that is represented by the boosting control instruction 102 executed before a branch instruction 105 corresponding to the executed result of the branch instruction 105, in the instruction sequence 103, and that is executed by the instruction sequence executing portion 104 before the branch instruction.

When a branch condition of a branch instruction in an instruction sequence is satisfied, the instruction execution state controlling portion 106 validates the execution of a boosted instruction that is represented by the first boosting instruction executed before the branch instruction and that is executed before the branch instruction. When the branch condition of the branch instruction in the instruction sequence is not satisfied, the instruction execution state controlling portion 106 cancels the execution of the boosted instruction that is represented by the first boosting instruction executed before the branch instruction and that is executed before the branch instruction.

In addition, when a branch condition of a branch instruction in an instruction sequence is not satisfied, the instruction execution state controlling portion 106 validates the execution of a boosted instruction that is represented by the second boosting instruction executed before the branch instruction and that is executed before the branch instruction. When the branch condition of the branch instruction in the instruction sequence is satisfied, the instruction execution state controlling portion 106 cancels the execution of the boosted instruction that is represented by the second boosting instruction executed before the branch instruction and that is executed before the branch instruction.

Moreover, when a branch condition of a branch instruction in an instruction sequence is satisfied and the second boosting instruction is executed before the branch instruction or when the branch condition of the branch instruction is not satisfied and the first boosting instruction is executed before the branch instruction, the instruction execution state controlling portion 106 cancels the execution of a boosted instruction that is represented by the first or second boosting instruction and that is executed before the branch instruction. When the reverse instruction is executed before the branch instruction and just after the first or second boosting instruction, the instruction execution state controlling portion 106 validates the execution of a boosted instruction that is represented by the reverse instruction and that is executed before the branch instruction.

In contrast, when a branch condition of a branch instruction in an instruction sequence is satisfied during the execution of the instruction sequence and the first boosting instruction is executed before the branch instruction or when the branch condition of the branch instruction is not satisfied and the second boosting instruction is executed before the branch instruction, the instruction execution state controlling portion 106 validates the execution of a boosted instruction that is represented by the first or second boosting instruction and that is executed before the branch instruction. When the reverse instruction is executed before a branch instruction and just after the first or second boosting instruction, the instruction execution state controlling portion 106 cancels the execution of a boosted instruction that is represented by the reverse instruction and that is executed before the branch instruction.

Furthermore, the instruction execution state controlling portion 106 controls the execution state of a boosted instruction that is represented by, for example, an n-th first or second boosting instruction in one fundamental block corresponding to the execution result of a branch instruction that is executed n-th time after the execution of the first or second boosting instruction. In addition, the instruction execution state controlling portion 106 controls the execution state of a boosted instruction that is represented by, for example, a third boosting instruction corresponding to the execution result of a branch instruction executed n-th time after the execution of the third boosting instruction.

The present invention can be applied for a boosting control method for executing a similar function to the above-described function.

In addition, the present invention can be applied for a boosting control method for placing the above-described boosting control instruction into an instruction sequence as a target for use with, for example, a compiler.

According to the present invention, a boosted instruction is not represented as an instruction code. Instead, the position of a boosted instruction is represented by a boosting control instruction. The boosting control instruction is not provided for each type of conventional instructions, but only for the boosting format. Thus, the number of types of the boosting control instructions is much smaller than that of the instruction codes that represent conventional boosted instructions.

More specifically, according to the present invention, at most several boosting control instructions such as a first boosting instruction that represents a boosted position of an instruction that is executed when a branch condition of a branch instruction is satisfied, a second boosting instruction that represents a boosted position of an instruction that is executed when a branch condition of a branch instruction is not satisfied, a reverse instruction that represents a boosted instruction executed in a reverse branch condition of a branch instruction of the execution of a boosted instruction that is represented by a boosting instruction just following the reverse instruction, and a third boosting instruction that represents the position of a boosted instruction placed before n branch instructions, are used.

Next, with reference to the accompanying drawings, an embodiment of the present invention will be described.
<Description of Boosting Instructions According to an Embodiment>

FIGS. 12 to 20 show boosting instructions according to the embodiment of the present invention.

In this embodiment, a boosted instruction is not represented as an instruction code. Instead, the position of a boosted instruction is represented by a boosting instruction. Boosting instructions are not provided corresponding to each type of conventional instructions but are prepared depending on the boosting format. Thus, the number of types of boosting instructions can be much smaller than the number of types of instruction codes that represent conventional boosted instructions.

Figures 1, 2:
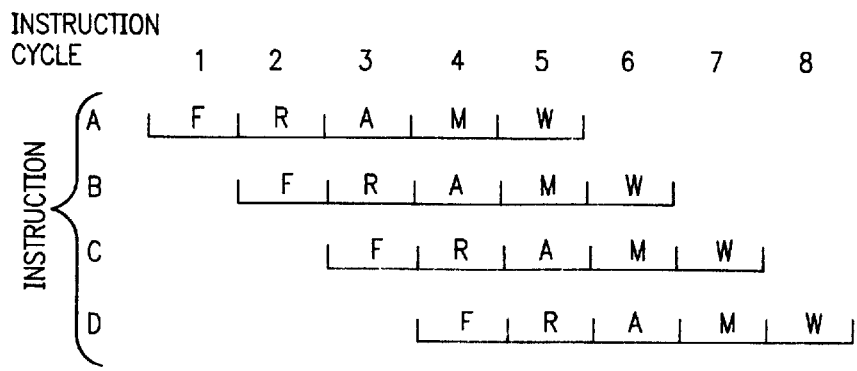
FIG. 1 is a schematic diagram for explaining a pipeline process.
FIG. 2 is a list showing an instruction sequence as example 1.

FIG. 12 is a list showing an instruction sequence including an instruction boosted from the taken side corresponding the instruction sequence of the example 1 shown in FIG. 2.

The position of an operation instruction "add r2,r5,r6" boosted from the taken side is represented by a boosting instruction "boost" that represents the position of an instruction that is placed just before the instruction and that is boosted from the taken side.

FIG. 13 is a list showing an instruction sequence including an instruction boosted from the not-taken side corresponding to the instruction sequence of the example 2 shown in FIG. 5. The position of an operation instruction "add r3,r5,r6" boosted from the not-taken side is represented by a boosting instruction "boost.n" that represents the position of an instruction that is placed just before the instruction and that is boosted from the not-taken side.

FIG. 14 is a list showing an instruction sequence including an instruction boosted from both branch sides corresponding to the instruction sequence of the example 3 shown in FIG. 7. The position of an operation instruction "add r3,r5,r6" boosted from the not-taken side is represented by a boosting instruction "boost.n" that represents the position of an instruction that is placed just before the instruction and that is boosted from the not-taken side. In addition, the position of an operation instruction "add r4,r7,r8" boosted from the taken side is represented by a boosting instruction "boost" that represents the position of an instruction that is placed just before the instruction and that is boosted from the taken side.

FIG. 15 is a list showing an instruction sequence including a boosted instruction placed before a plurality of branch instructions corresponding to the instruction sequence of the example 4 shown in FIG. 9. In this example, it is defined that when a plurality of booting instructions of the same type are used in the same fundamental block, an n-th boosting instruction in the fundamental block represents the position of a boosted instruction placed before n branch instructions. In other words, in FIG. 15, the position of an operation instruction "add r3,r5,r6" on the taken side corresponding to a first branch instruction that is placed before a first branch instruction "br r2,0,L1", is represented by a first boosting instruction "boost" that represents the position of an instruction that is placed just before the instruction and that is boosted from the taken side. In addition, the position of an operation instruction "add r4,r7,r8" on the taken side corresponding to a second branch instruction that is placed before a second branch instruction "br r3,0,L2" and the first branch instruction is represented by a second boosting instruction "boost" that represents the position of an instruction that is placed just before the instruction and that is boosted from the taken side.

FIG. 17 is a list showing an instruction sequence including a boosted instruction simply placed before a plurality of branch instructions corresponding to the instruction sequence of the example 5 shown in FIG. 16. In this case, the position of an operation instruction "add r4,r7,r8" on the taken side corresponding to a second branch instruction "br r3,0,L2" placed before a first branch instruction "br r2,0, L1", is represented by a boosting instruction "boost2" that represents the position of an instruction that is placed just before the instruction and that is boosted from the taken side of the second branch instruction. Particularly, in this case, a boosting instruction with a parameter (argument) that represents the number of branch instructions placed after the boosting instruction can be used.

FIG. 19 is a list showing an instruction sequence including boosted instructions that are complicatedly placed before a plurality of branch instructions corresponding to the instruction sequence of the example 6 shown in FIG. 18. In this example, it is defined that when a plurality of boosting instructions (they may be of different types) are used in the same fundamental block, a n-th boosting instruction in the fundamental block represents the position of a boosted instruction that is placed before n branch instructions. In other words, in FIG. 19, the position of an operation instruction "add r3,r5,r6" on the taken side corresponding to a first branch instruction "br r2,0,L1" that is placed just after the operation instruction "add r3,r5,r6", is represented by a first boosting instruction "boost" that represents the position of an instruction that is placed just before the instruction and that is boosted from the taken side. The position of an operation instruction "add r4,r7,r8" on the taken side corresponding to a second branch instruction placed before a first branch instruction is represented by a second boosting instruction "boost", that represents the position of an instruction that is placed just before the instruction and that is boosted from the taken side.

FIG. 20 is a list showing an instruction sequence including an instruction that is boosted from both branch sides and a reverse instruction corresponding to the instruction sequence of the example 3 shown in FIG. 7. As described in the example shown in FIG. 19, it is defined that when a plurality of boosting instructions (they may not be of the same types) are used in the same fundamental block, an n-th boosting instruction in the fundamental block represents the position of a boosted instruction that is placed before n branch instructions. Thus, an instruction sequence including instructions that are boosted from both branch sides cannot be represented. In FIG. 20, an instruction sequence including instructions that are boosted from both branch sides is represented with a reverse instruction "reverse". When a boosting instruction "boost" is placed just before the reverse instruction "reverse", it represents the position of an instruction that is boosted from the not-taken side of a branch instruction that is the same as a branch instruction corresponding to the boosting instruction "boost". When a boosting instruction "boost.n" is placed just before the reverse instruction "reverse", it represents the position of an instruction that is boosted from the taken side of a branch instruction that is the same as a branch instruction corresponding to the boosting instruction "boost.n" Thus, in the example shown in FIG. 20, the position of an operation instruction "add r3,r5,r6" that is boosted from the not-taken side is represented by a boosting instruction "boost.n", that represents the position of an instruction that is placed just before the instruction and that is boosted from the not-taken side. In addition, the position of an operation instruction "add r4,r7,r8" that is boosted from the taken side of a branch instruction that is the same as the branch instruction corresponding to the boosting instruction "boost.n", is represented by the reverse instruction "reverse" that is placed just before the operation instruction.

The range of each boosted instruction represented by the boosting instructions "boost" and "boost.n" and the reverse instruction "reverse", is from a boosting instruction or a reverse instruction to the next branch instruction, another boosting instruction, or another reverse instruction.

<Overall Construction of the Embodiment>

Figure 21:
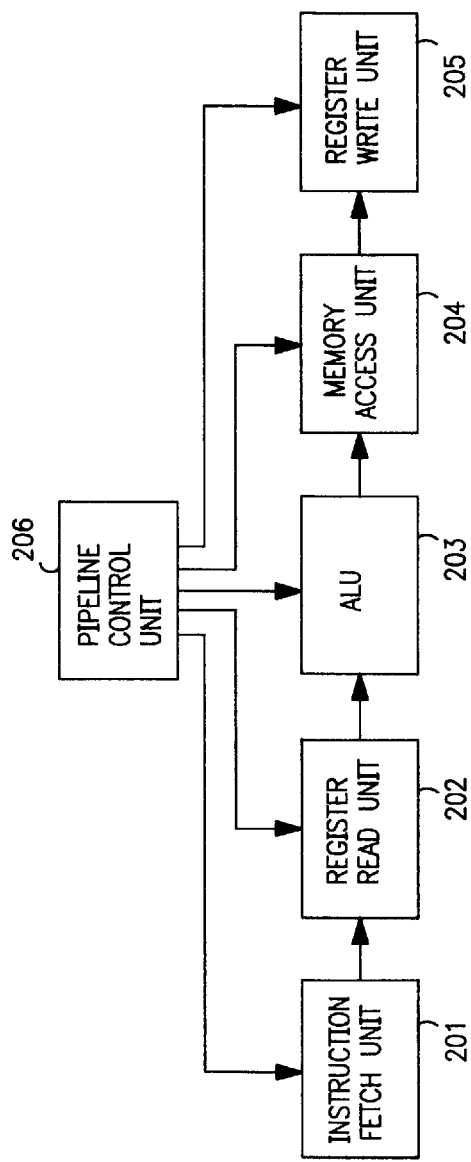
FIG. 21 is a block diagram showing the entire construction of the embodiment of the present invention.

FIG. 21 is a block diagram showing the entire construction of a pipeline processor that executes an instruction sequence including the above-described boosting instructions.

An instruction fetch unit 201 fetches an instruction from a memory (not shown).

A register read unit 202 decodes the instruction that is fetched from the memory and reads required data from a register in the processor.

An arithmetic and logic unit (ALU) 203 executes an arithmetic and logic instruction according to the decoded instruction.

A memory access unit 204 reads operand data from the memory or writes it to the memory.

A register write unit 205 writes the operated data to the register in the processor.

A pipeline control unit 206 controls the entire operation of the pipeline.

In the above-described construction, the register read unit 202 or the pipeline control unit 206 interprets the above-described boosting instructions and controls the pipeline.

<Control Process for Boosting Instructions>

Next, an example of a control process for boosting instructions executed by the register read unit 202 or the pipeline control unit 206 shown in FIG. 21 will be described with reference to an operation flow chart shown in FIG. 22. In the operation flow chart, an example of a boosting control process using two boosting instructions "boost" and "boost.n" and reverse instruction "reverse" is shown. In the control process, it is defined that when a plurality of boosting instructions (that may not be of the same type) are used in the same fundamental block, an n-th boosting instruction in the fundamental block represents the position of a boosted instruction that is placed before n branch instructions.

Figure 22:
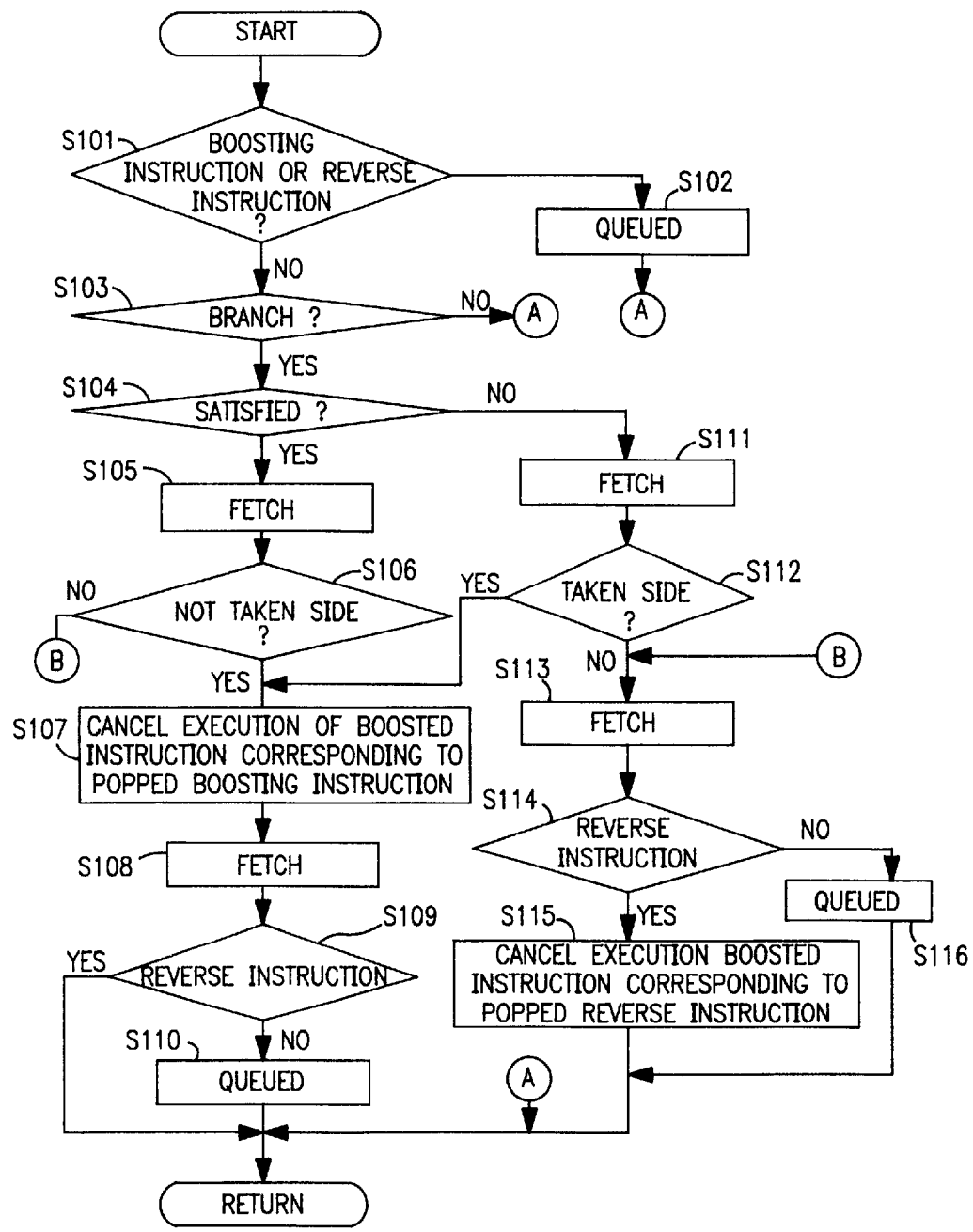
FIG. 22 is an operation flow chart showing the operation of the embodiment of the present invention.

In FIG. 22, at step S101, it is determined whether a decoded instruction is a boosting instruction "boost", a boosting instruction "boost.n", or a reverse instruction reverse.

When the decoded instruction is one of the boosting instructions or the reverse instruction (namely, the determined result at step S101 is YES), the flow advances to step S102. At step S102, the boosting instruction or the reverse instruction is pushed to a stack. Thus, the process of the operation flow chart shown in FIG. 22 is finished. For a boosting instruction, a control process other than the process of the operation flow chart shown in FIG. 22 is not executed.

On the other hand, when the decoded instruction is not any of the boosting instructions or the reverse instruction (namely, the determined result at step S101 is NO), the flow advances to step S103. At step S103, it is determined whether or not the decoded instruction is a branch instruction.

When the decoded instruction is not a branch instruction (namely, the determined result at step S103 is NO), the process of the operation flow chart shown in FIG. 22 is finished. For such an instruction, a conventional pipeline process is executed.

When the decoded instruction is a branch instruction (namely, the determined result at step S103 is YES), the flow advances to step S104. At step S104, it is determined whether or not a branch condition of the branch instruction is satisfied.

When the branch condition of the branch instruction is satisfied (namely, the determined result at step S104 is YES), the flow advances to step S105. At step S105, one boosting instruction is popped from a stack (not shown). When the stack is empty (not shown), the process of the operation flow chart shown in FIG. 22 is finished. At step S106, it is determined whether or not the boosting instruction popped at step S105 is the boosting instruction "boost.n" that represents the position of an instruction that is boosted from the not-taken side.

When the branch condition of the branch instruction is not satisfied (namely, the determined result at step S104 is NO), the flow advances to step S111. At step S111, one boosting instruction is popped from the stack. In this case, when the stack is empty (not shown), the process of the operation flow chart shown in FIG. 22 is finished. At step S112, it is determined whether or not the boosting instruction popped at step S111 is the boosting instruction "boost" that represents the position of an instruction boosted from the taken side.

With the stack, a control process that defines that when a plurality of boosting instructions that may not of the same type are used in the same fundamental block, an n-th boosting instruction in the fundamental block represents the position of a boosted instruction placed before n branch instructions is accomplished.

When the determined result at step S106 is YES (namely, the boosting instruction popped in the case that the branch condition is satisfied is the boosting instruction "boost.n" that represents the position of an instruction boosted from the not-taken side) or when the determined result at step S112 is YES (namely, the boosting instruction popped in the case that the branch condition is not satisfied is the boosting instruction "boost" that represents the position of an instruction boosted from the taken side, the flow advances to step S107. At step S107, the execution of the boosted instruction represented by the popped boosting instruction in the pipeline is cancelled. This control is accomplished by the pipeline control unit 206 that outputs an execution cancel signal to the ALU 203, the memory access unit 204, or the register write unit 205.

When the determined result at step S106 or S112 is YES, the flow advances to step S107. At step S107, a cancel process is executed. When the reverse instruction "reverse" (see FIG. 20) is placed just after the boosting instruction for which the cancel process is performed, the boosted instruction just after the reverse instruction "reverse" should be validated. At step S108, an instruction is popped from the stack. At step S109, it is determined whether or not the popped instruction is the reverse instruction "reverse". When the popped instruction is the reverse instruction "reverse" (namely, the determined result at step S109 is YES), the popped reverse instruction "reverse" is removed from the stack and then the process of the operation flow chart shown in FIG. 22 is finished. Thus, the execution of the boosted instruction just after the reverse instruction "reverse" in the pipeline is continued. When the popped instruction is a boosting instruction (namely, the determined result at step S109 is NO), the flow advances to step S110. At step S110, the popped boosting instruction is pushed to the stack as it is. Thereafter, the process of the operation flow chart shown in FIG. 22 is finished.

When the determined result at step S106 is NO (namely, the branch condition is satisfied) and the popped boosting instruction is the boosting instruction "boost" that represents the position of an instruction that is boosted from the taken side or when the determined result at step S112 is NO (namely, the branch condition is not satisfied and the popped boosting instruction is the boosting instruction "boost.n" that represents the position of an instruction boosted from the not-taken side, the popped boosting instruction is removed from the stack. Thus, the execution of the boosted instruction after the boosting instruction in the pipeline is continued.

When the determined result at step S106 or S112 is NO and the reverse instruction "reverse" is placed just after the validated boosting instruction, the boosted instruction after the reverse instruction "reverse" should be cancelled. At step S113, an instruction is popped from the stack. The flow then advances to step S114. At step S114, it is determined whether or not the popped instruction is the reverse instruction "reverse". When the popped instruction is the reverse instruction "reverse" (namely, the determined result at step S114 is YES), the flow advances to step S115. At step S115, the execution of the boosted instruction represented by the popped reverse instruction "reverse" in the pipeline is cancelled. Thus, the process of the operation flow chart shown in FIG. 22 is finished. When the popped instruction is the boosting instruction (namely, the determined result at step S114 is NO), the flow advances to step S116. At step S116, the popped boosting instruction is pushed to the stack as it is. Thereafter, the process of the operation flow chart shown in FIG. 22 is finished.

<Scheduling Method of Instructions>

Figure 23:
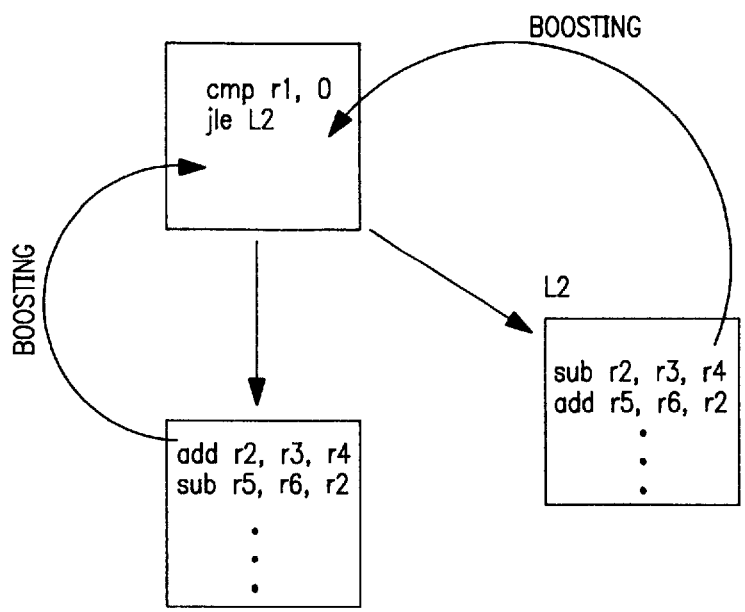
FIG. 23 is a schematic diagram showing an instruction scheduling method.

In this embodiment, the compiler performs a scheduling process for changing the execution position of an instruction adjacent to a branch instruction in an instruction sequence corresponding to a process transition flow shown in FIG. 23, and places the above-described boosting instructions and the reverse instruction in the instruction sequence.

When the compiler compiles the instruction sequence shown in FIG. 2, it determines whether or not the probability of the occurrence of the branching performed by a branch instruction "br r2,0,L1" in the instruction sequence is high corresponding to the analyzed result or the collected result of statistical information. When the probability of the occurrence of the branching is high, as shown in FIG. 12, the boosting instruction "boost" and the operation instruction "add r2,r5,r6" boosted from the taken side are placed before the branch instruction "br r2,0,L1"

When the compiler compiles the instruction sequence shown in FIG. 5, if it has determined that the probability of the occurrence of the branching of the branch instruction "br r2,0,L1" is low, it places the boosting instruction "boost.n" and the instruction "add r3,r5,r6" that is boosted from the not-taken side, before the branch instruction "br r2,0,L1", as shown in FIG. 13.

In some occasions, (namely, when the probability that the branching takes place is similar to the probability that the branching does not take place), the compiler may boost an instruction from both sides of one branch instruction. FIG. 14 shows the case that instructions are boosted from both sides of the branch instruction "br r2,0,L1" in the instruction sequence shown in FIG. 7.

When the compiler compiles the instruction sequence shown in FIG. 9, if it determines that the probability of the occurrence of the branching of both the first branch instruction "br r2,0,L1" and the second branch instruction "br r3,0,L2" in the instruction sequence is high, it places the first boosting instruction "boost", the instruction "add r3,r5,r6" boosted from the taken side of the first branch instruction, the second boosting instruction "boost", and the instruction "add r4,r7,r8" boosted from the taken side of the second branch instruction, before the branch instruction "br r2,0, L1", as shown in FIG. 15.

When the compiler compiles the instruction sequence shown in FIG. 16, if it determines that the probability of the occurrence of the branching of the first branch instruction "br r2,0,L1" and the second branch instruction "br r3,0,L2" is high, it places the boosting instruction "boost2" that is boosted before two branch instructions and the instruction "add r4,r7,r8" that is boosted from the taken side of the second branch instruction, before the branch instruction "br r2,0,L1", as shown in FIG. 17. When the compiler compiles the instruction sequence shown in FIG. 18, if it determines that the probability of the occurrence of the branching of the first branch instruction "br r2,0,L1" in the instruction sequence is high and the probability of the occurrence of the branching of the second branch instruction "br r3,0,L2" in the instruction sequence is low, it places the first boosting instruction "boost", the instruction "add r3,r5,r6" that is boosted from taken side of the first branch instruction, the second boosting instruction "boost.n", and the instruction "add r4,r7,r8" that is boosted from the not-taken side of the second branch instruction, before the branch instruction "br r2,0,L1", as shown in FIG. 19.

When the compiler boosts instructions from both sides of one branch instruction, the reverse instruction "reverse" may be used. FIG. 20 shows the case that the compiler boosts instructions from both sides of the branch instruction "br r2,0,L1" in the instruction sequence shown in FIG. 7. The compiler places the boosting instruction "boost.n", the instruction "add r3,r5,r6" that is boosted from not taken side of the branch instruction, the reverse instruction "reverse", and the instruction "add r4,r7,r8" that is boosted from taken side of the branch instruction, before the branch instruction "br r2,0,L1".

<A further Embodiment>

An example of the boosting control process using the two boosting instructions "boost" and "boost.n" and the reverse instruction "reverse" is shown with reference to the operation flow chart shown in FIG. 22. The boosting control process with the boosting instruction "boost2" that represents the position of a boosted instruction placed before a plurality of branch instructions shown in FIG. 17 can be accomplished as the same control process as that shown in the operation flow chart shown in FIG. 22. In this case, when the boosting instruction "boost2" is decoded, a control process is performed such that the instruction is substituted with, for example, two successive boosting instructions "boost", and these instructions are stacked.

In addition, the method of which the position of another boosted instruction is represented by a boosting instruction according to the present invention may be added to the conventional method by which a boosted instruction is represented by an instruction code that is different from a conventional instruction code.

According to the present invention, a boosted instruction is not represented as an instruction code. Instead, the position of a boosted instruction is represented by a boosting control instruction. Boosting control instructions are not provided for individual types of conventional instructions but are prepared depending on the boosting format. Thus, the number of the types of the boosting control instructions is much smaller than that of instruction codes that represent conventional boosted instructions.

As a result, even if the number of types of instruction codes that are executable in the processor is restricted by a represented instruction format, advanced boosting control can be accomplished, with at most several types of boosting control instructions, while maintaining compatibility to exiting instruction codes.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A boosting control method for, in an instruction sequence of a plurality of instructions, controlling an execution state of an instruction which may be executed subsequent to a branch instruction thereby boosting the instruction, the method comprising the steps of:

placing a boosting control instruction into the instruction sequence prior to the branch instruction, the boosting control instruction representing a position before the boosted instruction in the instruction sequence; and during the execution of the instruction sequence controlling the execution state of the boosted instruction having the position represented by the boosting control instruction based on the boosting control instruction.

2. The boosting control method as set forth in claim 1, wherein the boosting control instruction includes a first boosting instruction that represents the boosted position of an instruction executed when a branch condition of the branch instruction is satisfied.

3. The boosting control method as set forth in claim 2, further comprising the steps of:

validating the execution of the boosted instruction when the branch condition of the branch instruction in the instruction sequence is satisfied during the execution of the instruction sequence; and cancelling the execution of the boosted instruction when the branch condition of the branch instruction in the instruction sequence is not satisfied during the execution of the instruction sequence.

4. The boosting control method as set forth in claim 2, wherein the first boosting instruction is used a plurality of times in a fundamental block of the instruction sequence and an n-th first boosting instruction in the fundamental block of the instruction sequence represents the position of a boosted instruction placed before n branch instructions, where n is any natural number.

5. The boosting control method as set forth in claim 4, wherein the execution of the boosted instruction represented by the n-th first boosting instruction in the fundamental block is controlled corresponding to the result of a branch instruction executed the n-th time after the first boosting instruction is executed during the execution of the instruction sequence.

6. The boosting control method as set forth in claim 1, wherein the boosting control instruction includes a second boosting instruction that represents the boosted position of an instruction executed when the branch condition of the branch instruction is not satisfied.

7. The boosting control method as set forth in claim 6, further comprising the steps of:

validating the execution of the boosted instruction when the branch condition of the branch instruction in the instruction sequence is not satisfied during the execution of the instruction sequence; and cancelling the execution of the boosted instruction when the branch condition of the branch instruction in the instruction sequence is satisfied during the execution of the instruction sequence.

8. The boosting control method as set forth in claim 6, wherein the second boosting instruction is used a plurality of times in a fundamental block of the instruction sequence and an n-th second boosting instruction in the fundamental block of the instruction sequence represents the position of a boosted instruction placed before n branch instructions, where n is any natural number.

9. The boosting control method as set forth in claim 8, wherein the execution of the boosted instruction represented by the n-th second boosting instruction in the fundamental block is controlled corresponding to the result of a branch instruction executed the n-th time after the second boosting instruction is executed during the execution of the instruction sequence.

10. The boosting control method as set forth in claim 1, wherein the boosting control instruction includes:
   a first boosting instruction that represents the boosted position of an instruction execution when a branch condition of the branch instruction is satisfied; and
   a second boosting instruction that represents the boosted position of an instruction executed when the branch condition of the branch instruction is not satisfied; and
   a reverse instruction that represents the boosted position of an instruction executed when a branch condition of the branch instruction corresponding to the first boosting instruction is not satisfied when the first boosting instruction is placed before the reverse instruction, and that represents the boosted position of an instruction executed when a branch condition of the branch instruction corresponding to the second boosting instruction is satisfied when the second boosting instruction is placed before the reverse instruction.

11. The boosting control method as set forth in claim 10, further comprising the steps of:
   cancelling the execution of the boosted instruction represented by the first boosting instruction or the second boosting instruction and executed before the branch instruction when the branch condition of the branch instruction in the instruction sequence is satisfied during the execution of the instruction sequence and the second boosting instruction is executed before the branch instruction or when the branch condition of the branch instruction is not satisfied and the first boosting instruction is executed before the branch instruction and validating the execution of the boosted instruction represented by the reverse instruction and executed before the branch instruction when the reverse instruction is executed before the branch instruction and just after the first boosting instruction or the second boosting instruction; and
   validating the execution of the boosted instruction represented by the first boosting instruction or the second boosting instruction and executed before the branch instruction when the branch condition of the branch instruction in the instruction sequence is satisfied during the execution of the instruction sequence and the first boosting instruction is executed before the branch instruction or when the branch condition of the branch instruction is not satisfied and the second boosting instruction is executed before the branch instruction and cancelling the execution of the boosted instruction represented by the reverse instruction and executed before the branch instruction when the reverse instruction is executed before the branch instruction and just after the first boosting instruction or the second boosting instruction.

12. The boosting control method as set forth in claim 1, wherein the boosting control instruction includes a boosting instruction that represents the position of a boosted instruction placed before n branch instructions, where n is any natural number.

13. The boosting control method as set forth in claim 12, wherein the execution of the boosted instruction represented by the boosting instruction is controlled corresponding to the result of a branch instruction executed the n-th time after the boosting instruction is executed during the execution of the instruction sequence.

14. A processor apparatus having a boosting control portion for executing an instruction sequence of a plurality of instructions by boosting the execution of an instruction that may be executed subsequent to a branch instruction to a position prior to the branch instruction, the processor apparatus comprising:
   instruction sequence executing means for executing the instruction sequence based on a boosting control instruction inserted into the instruction sequence that represents a position before the boosted instruction; and
   instruction execution state controlling means for controlling the execution of the instruction sequence and wherein the boosted instruction, represented by the boosting control instruction, is executed before the branch instruction during the execution of the instruction sequence based on the boosting control instruction.

15. The processor apparatus as set forth in claim 14, wherein the boosting control instruction includes a first boosting instruction that represents the boosted position of an instruction executed when a branch condition of the branch instruction is satisfied.

16. The processor apparatus as set forth in claim 15, wherein said instruction execution state controlling means validates the execution of the boosted instruction executed before the branch instruction when the branch condition of the branch instruction in the instruction sequence is satisfied; and
   wherein said instruction execution state controlling means cancels the execution of the boosted instruction when the branch condition of the branch instruction in the instruction sequence is not satisfied.

17. The processor apparatus as set forth in claim 15, wherein the first boosting instruction is used a plurality of times in a fundamental block of the instruction sequence and an n-th first boosting instruction in the fundamental block of the instruction sequence represents the position of a boosted instruction placed before n branch instructions, where n is any natural number.

18. The processor apparatus as set forth in claim 17, wherein said instruction execution state controlling means controls the execution of the boosted instruction represented by the n-th first boosting instruction in the fundamental block corresponding to the result of a branch instruction executed the n-th time after the first boosting instruction is executed during the execution of the instruction sequence.

19. The processor apparatus as set forth in claim 14, wherein the boosting control instruction includes a second boosting instruction that represents the boosted position of an instruction executed when the branch condition of the branch instruction is not satisfied.

20. The processor apparatus as set forth in claim 19, wherein said instruction state controlling means validates the execution of the boosted instruction when the branch condition of the branch instruction in the instruction sequence is not satisfied; and
   wherein said instruction execution state controlling means cancels the execution of the boosted instruction when the branch condition of the branch instruction in the instruction sequence is satisfied.

21. The processor apparatus as set forth in claim 19, wherein the second boosting instruction is used a plurality of times in a fundamental block of the instruction sequence and an n-th second boosting instruction in the fundamental block of the instruction sequence represents the position of a boosted instruction placed before n branch instructions, where n is any natural number.

22. The processor apparatus as set forth in claim 21, wherein said instruction execution state controlling means controls the execution of the boosted instruction represented by the n-th second boosting instruction in the fundamental block corresponding to the result of a branch instruction executed the n-th time after the second boosting instruction is executed during the execution of the instruction sequence.

23. The processor apparatus as set forth in claim 14, wherein the boosting control instruction includes:
   a first boosting instruction that represents the boosted position of an instruction executed when a branch condition of the branch instruction is satisfied; and
   a second boosting instruction that represents the boosted position of an instruction executed when the branch condition of the branch instruction is not satisfied; and
   a reverse instruction that represents the boosted position of an instruction executed when a branch condition of the branch instruction corresponding to the first boosting instruction is not satisfied when the first boosting instruction is placed before the reverse instruction, and that represents the boosted position of an instruction executed when the branch condition of a branch instruction corresponding to the second boosting instruction is satisfied when the second boosting instruction is placed before the reverse instruction.

24. The processor apparatus as set forth in claim 23, wherein said instruction execution state controlling means cancels the execution of the boosted instruction represented by the first boosting instruction or the second boosting instruction and executed before the branch instruction when the branch condition of the branch instruction in the instruction sequence is satisfied during the execution of the instruction sequence and the second boosting instruction is executed before the branch instruction or when the branch condition of the branch instruction is not satisfied and the first boosting instruction is executed before the branch instruction and validating the execution of the boosted instruction represented by the reverse instruction and executed before the branch instruction when the reverse instruction is executed before the branch instruction and just after the first boosting instruction or the second boosting instruction; and
   wherein said instruction execution state controlling means validates the execution of the boosted instruction that is represented by the first boosting instruction or the second boosting instruction and executed before the branch instruction when the branch condition of the branch instruction in the instruction sequence is satisfied during the execution of the instruction sequence and the first boosting instruction is executed before the branch instruction or when the branch condition of the branch instruction is not satisfied and the second boosting instruction is executed before the branch instruction and cancelling the execution of the boosted instruction represented by the reverse instruction and executed before the branch instruction when the reverse instruction is executed before the branch instruction and just after the first boosting instruction or the second boosting instruction.

25. The processor apparatus as set forth in claim 14, wherein the boosting control instruction includes a boosting instruction that represents the position of a boosted instruction placed before n branch instructions, where n is any natural number.

26. The processor apparatus as set forth in claim 25, wherein said instruction execution state controlling means controls the execution of the boosted instruction represented by the boosting instruction corresponding to the result of a branch instruction executed the n-th time after the boosting instruction is executed during the execution of the instruction sequence.

27. A boosting control method for, in an instruction sequence having a plurality of instructions, boosting execution of an instruction which may be executed subsequent to a branch instruction to a position prior to the execution of the branch instruction thereby boosting the instruction, the method comprising the steps of:
   identifying an instruction to be boosted; and
   placing a boosting control instruction into an instruction sequence prior to the branch instruction, the boosting control instruction represents a position before the boosted instruction in the instruction sequence.

28. The boosting control method as set forth in claim 27, wherein the boosting control instruction includes a first boosting instruction that represents the boosted position of an instruction executed when a branch condition of the branch instruction is satisfied.

29. The boosting control method as set forth in claim 28, wherein the first boosting instruction is used a plurality of times in a fundamental block of the instruction sequence and an n-th first boosting instruction in the fundamental block of the instruction sequence represents the position of a boosted instruction placed before n branch instructions, where n is any natural number.

30. The boosting control method as set forth in claim 27, wherein the boosting control instruction includes a second boosting instruction that represents the boosted position of an instruction executed when the branch condition of the branch instruction is not satisfied.

31. The boosting control method as set forth in claim 30, wherein the second boosting instruction is used a plurality of times in a fundamental block of the instruction sequence and an n-th second boosting instruction in the fundamental block of the instruction sequence represents the position of a boosted instruction placed before n branch instructions, where n is any natural number.

32. The boosting control method as set forth in claim 27, wherein the boosting control instruction includes:
   a first boosting instruction that represents the boosted position of an instruction executed when a branch condition of the branch instruction is satisfied; and
   a second boosting instruction that represents the boosted position of an instruction executed when the branch condition of the branch instruction is not satisfied; and
   a reverse instruction that represents the boosted position of an instruction executed when a branch condition of the branch instruction corresponding to the first boosting instruction is not satisfied when the first boosting instruction is placed before the reverse instruction, and that represents the boosted position of an instruction executed when a branch condition of the branch instruction corresponding to the second boosting instruction is satisfied when the second boosting instruction is placed before the reverse instruction.

33. The boosting control method as set forth in claim 27, wherein the boosting control instruction includes a third boosting instruction that represents the position of a boosted instruction placed before n branch instructions, where n is any natural number.

34. A boosting control apparatus for processing an instruction sequence having a plurality of instructions, by boosting execution of an instruction which may be executed subsequent to a branch instruction to a position prior to the execution of the branch instruction, the apparatus comprising:

- means for extracting a branch instruction from the instruction sequence;
- means for analyzing the extracted branch instruction and identifying an instruction to be boosted; and
- means for placing, prior to the extracted branch instruction in the instruction sequence, a boosting control instruction representing a position before the boosted instruction in the instruction sequence.

35. The boosting control apparatus as set forth in claim 34, wherein the boosting control instruction includes a first boosting instruction that represents the boosted position of an instruction executed when a branch condition of the branch instruction is satisfied.

36. The boosting control apparatus as set forth in claim 35, wherein the first boosting instruction is used a plurality of times in a fundamental block of the instruction sequence and an n-th first boosting instruction in the fundamental block of the instruction sequence represents the position of a boosted instruction placed before n branch instructions, where n is any natural number.

37. The boosting control apparatus as set forth in claim 34, wherein the boosting control instruction includes a second boosting instruction that represents the boosted position of an instruction executed when the branch condition of the branch instruction is not satisfied.

38. The boosting control apparatus as set forth in claim 37, wherein the second boosting instruction is used a plurality of times in a fundamental block of the instruction sequence and an n-th second boosting instruction in the fundamental block of the instruction sequence represents the position of a boosted instruction placed before n branch instructions, where n is any natural number.

39. The boosting control apparatus as set forth in claim 34, wherein the boosting control instruction includes:
- a first boosting instruction that represents the boosted position of an instruction executed when a branch condition of the branch instruction is satisfied; and
- a second boosting instruction that represents the boosted position of an instruction executed when the branch condition of the branch instruction is not satisfied; and
- a reverse instruction that represents the boosted position of an instruction executed when a branch condition of the branch instruction corresponding to the first boosting instruction, is not satisfied when the first boosting instruction is placed just before the reverse instruction, and that represents the boosted position of an instruction executed when a branch condition of the branch instruction corresponding to the second boosting instruction is satisfied when the second boosting instruction is placed just before the reverse instruction.

40. The boosting control apparatus as set forth in claim 34, wherein the boosting control instruction includes a third boosting instruction that represents the position of a boosted instruction placed before n branch instructions, where n is any natural number.

* * * * *